United States Patent [19]

Loodberg et al.

[11] Patent Number: 4,724,952
[45] Date of Patent: Feb. 16, 1988

[54] SINGLE-BELT CONVEYOR

[75] Inventors: Jan A. T. Loodberg, Nyhamnsläge; Arne E. Wall, Landskrona, both of Sweden

[73] Assignee: AB Scaniainventor, Helsingborg, Sweden

[21] Appl. No.: 909,115

[22] PCT Filed: Dec. 23, 1985

[86] PCT No.: PCT/SE85/00544
§ 371 Date: Aug. 26, 1986
§ 102(e) Date: Aug. 26, 1986

[87] PCT Pub. No.: WO86/04042
PCT Pub. Date: Jul. 17, 1986

[30] Foreign Application Priority Data

Dec. 27, 1984 [SE] Sweden .................... 8406617

[51] Int. Cl.⁴ .................................. B65G 15/08
[52] U.S. Cl. ........................................... 198/819
[58] Field of Search ............................ 198/819, 839

[56] References Cited

U.S. PATENT DOCUMENTS

| 3,338,383 | 8/1967 | Hashimoto | 198/819 |
| 4,535,884 | 8/1985 | Suppan | 198/819 X |
| 4,565,285 | 1/1986 | Koistinen | 198/819 |
| 4,625,860 | 12/1986 | Kawasaki et al. | 198/819 |

FOREIGN PATENT DOCUMENTS

| 644171 | 4/1937 | Fed. Rep. of Germany . | |
| 1431684 | 5/1969 | Fed. Rep. of Germany . | |
| 3300638 | 7/1984 | Fed. Rep. of Germany . | |
| 0025383 | 2/1977 | Japan | 198/819 |
| 2132970 | 7/1984 | United Kingdom . | |

Primary Examiner—Robert J. Spar
Assistant Examiner—D. Glenn Dayoan
Attorney, Agent, or Firm—Browdy and Neimark

[57] ABSTRACT

A belt conveyor having a conveyor belt which is flexible in the transverse direction and which, along part of its path of travel, is twisted about it own axis from a lower guide roller (2) to an upper guide roller (3) for forming a tube for the conveyance of goods. The belt (1) runs over the guide rollers in a transversely substantially straightened state. The guide rollers (2, 3), in dependence upon the pitch of the belt (1) in the twisted part thereof, are so inclined relative to the center line of the tube that the two edge portions (6, 7) of the belt in the twisted part thereof engage each other substantially edge to edge. The edge portions (6, 7) of the belt (1) have substantially inextensible reinforcements (8, 9) for taking up longitudinal tensile forces in the belt. The belt is further so stretched and twisted between the guide rollers (2, 3) that the edge portions (6, 7) in the twisted part of the belt engage each other substantially edge to edge and follow helical lines which are contained in a cylinder surface having a smaller diameter than the diameters of the cylinder surfaces in which the helical lines for other longitudinal portions of the belt are contained.

10 Claims, 13 Drawing Figures

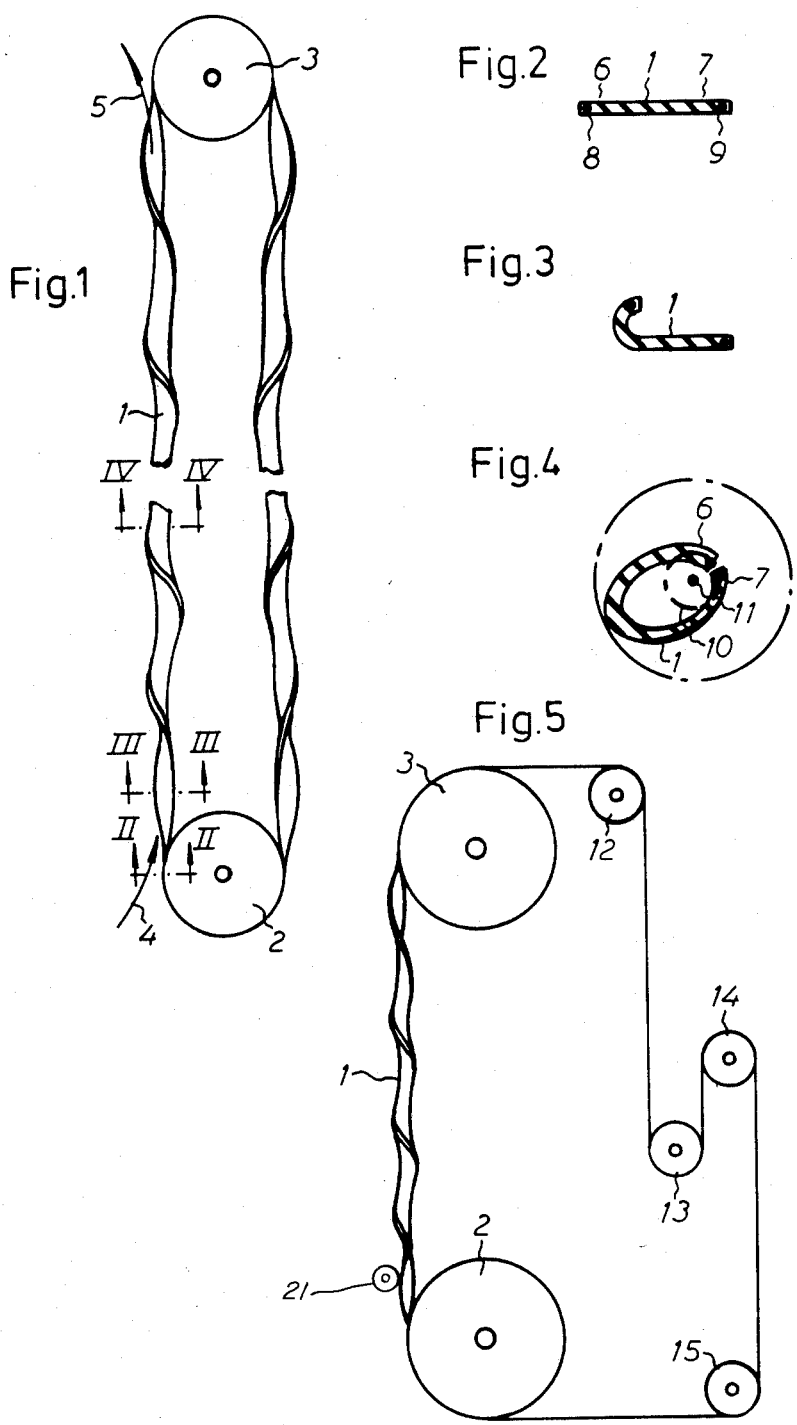

SINGLE-BELT CONVEYOR

The present invention relates to a belt conveyor having a conveyor belt which is flexible in the transverse direction and which, along part of its path of travel, is twisted about its own axis from a lower guide roller to an upper guide roller for forming a tube for conveying goods, the belt running over the guide rollers in a transversely substantially straightened state.

For the closed conveyance of bulk goods, belt conveyors having a conveyor belt formed into a tube are previously known in the art. The rim or edge portions of the conveyor belt are then held together by mutually engaging means on the very rim portions or by external means. One example of the latter technique is a tube which is formed from a belt of uniform cross-sectional shape by means of a plurality of sets of rollers with a large number of rollers distributed around the periphery of the tube. In this way, the tube will be closed by a considerable overlap of the inner side of the belt on the outer side thereof, whether the belt is twisted about its own axis or not. In the case of a twisted belt, it is known to make the overlap extend throughout the entire circumference of the tube, such that the thickness of the tube wall will always be twice the thickness of the belt.

The considerable overlap in the last-mentioned conveyors entails a relatively low transport capacity as compared with conveyors whose rim portions are held together by engagement means provided on the rim portions of the belt, i.e. for the same belt width and belt velocity. However, the manufacturing costs for belts having such engagement means are comparatively high and there is a risk that the engagement means will be clogged by the goods conveyed so as to be unable to perform their retaining function properly.

The object of the present invention therefore is to provide a belt conveyor of the type mentioned in the introduction to this specification, which has a simple construction and is relatively inexpensive, and yet ensures a high transport capacity.

The contemplated belt conveyor should also be especially well suited for a more or less vertical conveyance of goods.

According to one aspect of the invention, this object is achieved by a belt conveyor which is characterized in that the guide rollers, in dependence upon the pitch of the belt in the twisted part thereof, are so inclined in relation to the centre line of the tube that the two edge portions of the belt in the twisted part thereof engage each other substantially edge to edge.

The belt according to the invention may be extensible, e.g. by consisting of an elastic material such as rubber, but the extensibility of the edge portions of the belt is suitably less in the longitudinal direction of the belt than the extensibility of the rest of the belt. The belt may however have the same elasticity in the longitudinal direction throughout the entire cross-section and consist e.g. of rubber with a uniform reinforcing fabric throughout the entire width and length of the belt.

In a first embodiment, the edge portions of the belt have substantially inextensible reinforcements for taking up longitudinal tensile forces in the belt. The longitudinal portions of the belt adjacent its edge portions will thus follow helical lines having a smaller diameter, i.e. the diameter of the cylinder surface in which the helical lines are contained, than longitudinal belt portions located at a greater distance from the two edge portions of the belt.

In a second embodiment in which the belt has a constant extensibility throughout the cross-section, the entire belt is however contained in substantially the same cylinder surface, possibly with the exception of the outer edge portions which then project outside this cylinder surface.

By the orientation of the guide rollers according to the invention, the belt will have no or only a slight tendency to move axially on the guide rollers and, without the use of any particular sets of guide rollers for forming and maintaining the tube, it will pass over the rollers in the transversely substantially straightened state in such a manner that the edges of the belt, at that part of the belt which makes contact with a guide roller, will be contained in radial planes to the axis of the guide roller. In order to further ensure that the belt will not move sideways on the guide rollers, these may be cambered.

According to the invention, the inclination or orientation of the guide rollers thus is determined by the pitch of the belt in the twisted part thereof or, in other words, by the number of full turns and parts of a turn the belt is twisted about its own axis between the guide rollers. In its path of return, the belt may travel either in a planar state or in a twisted state, suitably twisted in a direction opposite to that in which it is twisted when travelling from the lower guide roller to the upper guide roller, or in a combination of said two states.

The inlet opening and the outlet opening of the conveyor tube can be arranged, as desired, on any side of the belt, i.e. the point of infeed can be located on the side of the belt which faces/faces away from the guide roller at the point of infeed. Similarly, the point of outfeed can be located on the side of the belt which faces/faces away from the guide roller at the point of outfeed.

When the point of infeed of the goods at the lower guide roller is disposed on the side where the belt leaves the guide roller, the belt run travelling upwards from the lower guide roller may be so immersed in the goods to be transported that the lower opening of the tube is situated entirely underneath the surface of the goods. This can be achieved by arranging an infeed container at the lower guide roller, this container enclosing the belt run travelling upwards from the lower guide roller, and having a slot at its bottom for admitting the belt run into the container.

By the present invention, the belt is formed into a closed tube in a very short distance. This distance can be further reduced by means of a pressure roller provided at each guide roller. The pressure roller is then placed so as to press against that of the two edge portions of the belt which has the lowest tension. The fact that the belt has different tension in its edge portions adjacent each guide roller is because the edge portions describe different paths of movement up to the point where they enter into contact with each other. By using such pressure rollers, variations otherwise existing in the tension along the edge portions between the guide rollers are equalized, such that the relative sliding movement or friction between the edge portions in the twisted part of the belt is minimized.

According to another aspect of the invention, the object indicated above is achieved in that the edge portions of the belt have substantially inextensible reinforcements for taking up longitudinal tensile forces in the belt and in that the belt is so stretched and twisted between the guide rollers that the edge portions in the twisted part of the belt engage each other substantially edge to edge and follow helical lines which are contained in a cylinder surface having a smaller diameter than the diameters of the cylinder surfaces in which the helical lines for other longitudinal portions of the belt are contained.

The invention will be described in greater detail hereinbelow with reference to the accompanying drawings.

FIG. 1 is a side view of a first embodiment of the belt conveyor according to the invention and illustrates the principle design thereof.

FIGS. 2, 3 and 4 are cross-sections of the belt taken along the lines II—II, III—III and IV—IV, respectively, in FIG. 1.

FIG. 5 is a side view of a second embodiment of a belt conveyor according to the invention.

Figure 6:
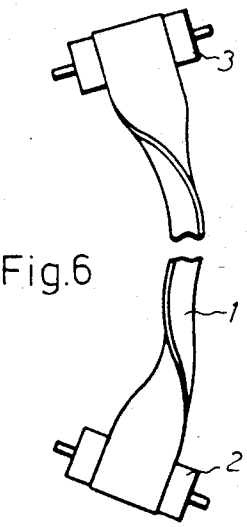
FIGS. 6 and 7 illustrate different possible orientations of guide rollers for the belt, the actual orientation being not shown in the other Figures.

The belt conveyor illustrated in FIG. 1 has a conveyor belt 1 which is guided over end rollers 2 and 3 from a point for infeed of goods, indicated by an arrow 4, to a point for outfeed of goods indicated by an arrow 5. The conveyor belt 1 travels in a closed path from the point of infeed 4 to the point of outfeed 5, over the upper guide roller 3, and returns via the lower guide roller 2 to the point of infeed 4. The belt 1 is flexible in the transverse direction by being made of an elastic material, such as rubber. From the point of infeed 4 to the point of outfeed 5, the belt 1 is twisted about its own axis, such that the two edge portions 6, 7 of the belt 1 engage each other and form a tube for conveying the goods throughout the major part of the distance between the point of infeed 4 and the point of outfeed 5.

At the point of infeed 4, the conveyor tube formed by the belt 1 has a feed or inlet opening which is defined between the point where the belt 1 leaves the guide roller 2 and where the edge portions 6 and 7 of the belt are maximally spaced from each other, and the point where the edge portions 6 and 7 enter into engagement with each other. The transition of the belt from the planar to the closed state is illustrated in FIGS. 2, 3 and 4. Although the belt 1 may be homogeneous and consist of the same material throughout its entire width, it may be convenient in some cases to make its edge portions less extensible in the longitudinal direction of the belt than the rest of the belt. The edge portions of the belt 1 may for instance have substantially inextensible reinforcements for taking up longitudinal tensile forces in the belt. These reinforcements may consist of fabric inserts, such as cords, or steel wires 8, 9. However, the reinforcements may also be external and may for instance project from the profile of the rest of the belt, while being connected to the belt. In the case where the edge portions 6 and 7 of the belt 1 are less extensible in the longitudinal direction than the rest of the belt, the helical lines which the edge portions 6, 7 follow, will be contained in a cylinder surface 10 having a smaller diameter than the diameters of the cylinder surfaces in which the helical lines for other longitudinal portions of the belt 1 are contained. The belt 1, with its periphery, will enclose a straight line, indicated by a dot 11 in FIG. 4, between the point of infeed 4 and the point of outfeed 5.

In the embodiment according to FIG. 1, the belt 1 is also twisted in its path of return from the guide roller 3 to the guide roller 2, preferably to an equal extent as and in a direction opposite to that in which the belt 1 is twisted when travelling from the point of infeed 4 to the point of outfeed 5. In the free state, it is thus possible to define an inner side and an outer side of the belt, i.e. the belt is not twisted at all.

An alternative embodiment is illustrated in FIG. 5 where the distance of conveyance of the goods is equal to that in the embodiment of FIG. 1. Instead of directly returning the belt from the guide roller 3 to the guide roller 2, the embodiment according to FIG. 5 comprises another four rollers 12, 15 defining the path of return of the belt 1 from the guide roller 3 to the guide roller 2. In this embodiment, the belt 1 is not twisted in its path of return but travels in a transversely straightened state along said path. The guide rollers 13 and 14 may be positionally adjustable in order to give the belt 1 a suitable tension. The belt 1 is suitably driven by the roller 3 or the rollers 13 and 14.

Figure 7:
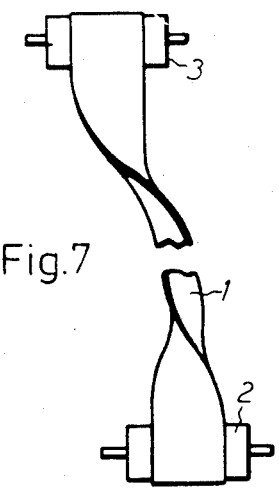

Since the belt 1 is twisted about its own axis between the rollers 2 and 3, the longitudinal direction of the belt, immediately adjacent these rollers, will not be parallel to a line interconnecting mutually corresponding points on these rollers. In order that the belt 1 should not tend to move off the rollers, the guide rollers should be so oriented that the edges of the belt, at that part of the belt which makes contact with a guide roller, are in radial planes with respect to the axis of the guide roller. If the belt 1 is twisted an uneven number of half turns about its own axis, such an inclination of the guide rollers 2 and 3 relative to the centre line of the tube is required as is schematically illustrated in FIG. 6, it being presupposed that the axes of the guide rollers 2 and 3 are in one and the same plane. In this manner, the two edge portions 6, 7 of the belt 1 in the twisted part thereof will engage each other substantially edge to edge. Thus, there is substantially no overlapping of the belt. If the belt 1 is twisted an even number of half turns about its own axis, i.e. a number of full turns, such an orientation of the guide rollers 2 and 3 as shown in FIG. 7 is required.

Figure 8:
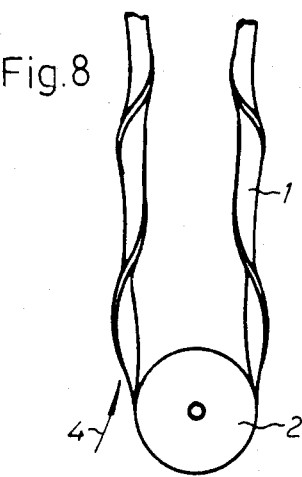
FIGS. 8 and 9 show different positions of the point of infeed of the goods.
Figure 9:
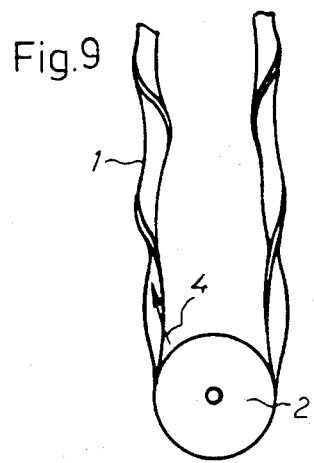
Figure 10:
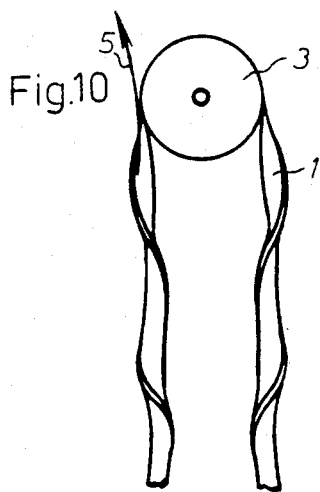
FIGS. 10 and 11 show different positions of the point of outfeed of the goods.
Figure 11:
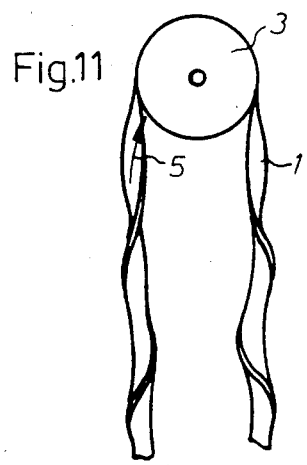

Different in- and outfeed devices are conceivable in combination with the belt conveyor according to the invention. It is however desirable that the goods supplied be imparted a component of motion in the direction of travel of the belt 1 from the point of infeed 4 to the point of outfeed 5. As shown in FIG. 8, the point of infeed may be located on that side of the belt which is facing away from the guide roller 2 but may also, as shown in FIG. 9, be located on the side of the belt facing the guide roller 2. Similarly, the outfeed device should be associated with the outlet opening of the tube, which may be located on the side of the belt facing away from the guide roller 3, as shown in FIG. 10, or on the side of the belt facing the guide roller 3, as shown in FIG. 11.

Both the distance of infeed and the distance of outfeed are substantially determined by the belt width and may, if the belt is fully straightened in the transverse direction, have a length of approximately four times the belt width. These distances can be reduced to some extent by means of suitably positioned pressure rollers 21 which, at any rate, may ensure effective closure of the tube at the beginning and at the end of the distance of conveyance, while equalizing the tension in the edge portions of the belt. For example, a pressure roller 21 may be provided between the guide roller 2 and the point where the edge portions 6, 7 of the belt engage each other.

As an example of a usable pitch, the length of one torsional turn of the belt may amount to approximately six times the belt width. Belt velocities in the order of 5-10 m/sec. are possible, which means a very high transport capacity.

Since the belt is twisted, the goods will rotate about the centre of the conveyor tube when being transported from the point of infeed to the point of outfeed and, thus, be subjected to a centrifugal force. In the embodiment according to FIG. 4 using edge reinforcements, the centrifugal force will be greatest at a maximum distance from the edge portions, for which reason the goods tend to move away from the edge portions. As a result, the conveyor may even be used for transporting liquids without necessitating a liquid-proof contact between the edges of the belt.

The belt may pass over a guide roller in twisted or untwisted tubular shape. The radius of curvature of the tube over the guide roller must then be large in relation to the tube diameter. When the tube passes over a guide roller in the untwisted state, it is advantageous if the belt has distinct tractive edges which are together guided in towards the roller, for instance, in a wedge-shaped groove, the tube being located radially outwardly of the groove.

Many modifications of the embodiments described above are possible within the inventive scope. Thus, in order to relieve the belt, it is possible to provide separate wires. In addition, these may be applied so as to tend to urge the edge portions of the belt against each other to further seal the tube.

One or more wires can also be caused to run inside the conveyor tube between the point of infeed and the point of outfeed and then serve to entrain the goods and, to that end, may optionally be provided with widened portions at suitable intervals. These widened portions may have a cross-sectional shape corresponding to the cross-sectional shape of the conveyor tube and are then directly load-carrying.

Figure 12:
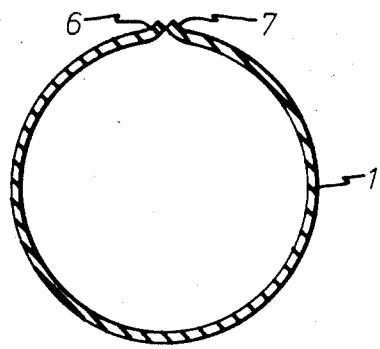
FIG. 12 is cross-section of a belt tube.

FIG. 12 is a cross-sectional view of a tube which is formed from a belt of uniform cross-section and substantially constant extensibility throughout the cross-section. In this case, the edge portions 6, 7 will engage each other substantially edge to edge in a slightly projecting state with respect to the cylinder surface in which the rest of the belt 1 is contained. Thus, substantially no such overlap exists as in the tubes of the conventional technique but the inner side of the belt at one edge portion may approach and even engage the inner side of the belt at the other edge portion.

Figure 13:
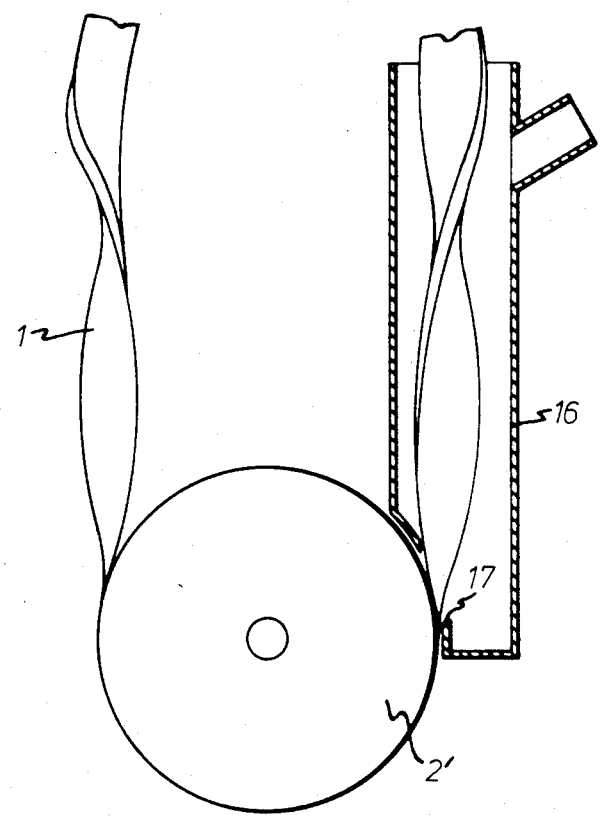
FIG. 13 shows a feeder device.

FIG. 13 shows a container 16 which is arranged at a lower guide roller 2' and provided at its bottom with a slot 17 through which the run of the belt 1 travelling upwards from the guide roller 2' enters into the container 16. This has a sufficient height to enable the goods fed into the container to completely cover the lower funnel-shaped opening of the tube, such that the belt 1 will entrain the goods into the tube for hoisting it to an upper guide roller.

It should finally be emphasized that the belt conveyor according to the invention is suitable for conveying any type of goods, including piece goods, bulk goods, liquids and goods suspended in liquids.

We claim:

1. A belt conveyor having a conveyor belt which is flexible in the transverse direction and which, along part of its path of travel, is helically twisted about its own axis from a lower guide roller (2) to an upper guide roller (3) for forming a tube for conveying goods, the belt (1) running over the guide rollers in a transversely substantially straightened state, wherein the upper and lower guide rollers (2, 3) are so oriented relative to the center line of the tube that the two edge portions (6, 7) of the belt in the twisted part thereof are substantially non-overlapping and engage each other substantially edge to edge.

2. Belt conveyor as claimed in claim 1, wherein the belt (1) is extensible but that its edge portions (6, 7) are less extensible in the longitudinal direction of the belt than the remainder of the belt.

3. Belt conveyor as claimed in claim 1 wherein, the edge portions (6, 7) of the belt (1) have substantially inextensible reinforcements (8, 9) for taking up longitudinal tensile forces in the belt.

4. Belt conveyor as claimed in claim 1, wherein the belt (1) is also twisted in its path of return from the upper guide roller (3) to the lower guide roller (2) in the opposite direction with respect to how it is twisted when travelling from the lower guide roller to the upper guide roller.

5. Belt conveyor as claimed in claim 1, wherein a goods infeed point is arranged that the lower guide roller (2) on the side where the belt leaves said lower guide roller.

6. Belt conveyor as claimed in claim 1, wherein the belt run travelling upwards from the lower guide roller (2) is so immersed in the goods to be conveyed that the lower opening of the tube is located completely underneath the surface of the goods.

7. Belt conveyor as claimed in claim 6, further comprising a container (16) for the infeed of goods at the lower guide roller (2'), which container encloses the belt run travelling upwards from the lower guide roller and having a slot (17) for the introduction of said belt run at the bottom of the container.

8. Belt conveyor as claimed in claim 1, further comprising a pressure roller provided at each guide roller (2, 3), said pressure roller being pressed against one of the edge portions (6, 7) of the belt between the guide roller and the point where the edge portions (6, 7) of the belt engage each other.

9. Belt conveyor having a conveyor belt which is flexible in the transverse direction and which, along parts of its path of travel, is helically twisted about its own axis from a lower guide roller (2) to an upper guide roller (3) for forming a tube for conveying goods, the belt (1) running over the guide rollers in a transversely substantially straightened state, wherein the edge portions (6, 7) of the belt (1) have substantially inextensible reinforcements (8, 9) for taking up longitudinal tensile forces in the belt, and that the belt is so stretched and twisted between the upper and lower guide rollers and the upper and lower guides rollers are so oriented with respect to the center line of the belt (2, 3) that the edge portions (6, 7) in the twisted part of the belt are substantially non-overlapping and engage each other substantially edge to edge and follow helical lines contained in a cylinder surface of a smaller diameter than the diameters of the cylinder surfaces in which the helical lines for other longitudinal portions of the belt are contained.

10. Belt conveyor as claimed in claim 9, wherein the belt (1) is also twisted in its path of return from the upper guide roller (3) to the lower guide roller (2) in the opposite direction with respect to how it is twisted when travelling from the lower guide roller to the upper guide roller.

* * * * *